US011991169B2

(12) United States Patent
Solano Gomez et al.

(10) Patent No.: US 11,991,169 B2
(45) Date of Patent: May 21, 2024

(54) ONE-SHOT BEHAVIORAL BIOMETRICS FOR LOGIN AUTHENTICATION USING MACHINE LEARNING MODEL

(71) Applicant: EASY SOLUTIONS ENTERPRISES, CORP., Coral Gables, FL (US)

(72) Inventors: Jesus Alberto Solano Gomez, Bogota D.C. (CO); Martin Ochoa Ronderos, Bogota D.C. (CO); Esteban Rivera Guerrero, Bogota D.C. (CO); Alejandra Castelblanco Cruz, Bogota D.C. (CO); Lizzy Tengana Hurtado, Bogota D.C. (CO); Christian David Lopez Escobar, Bogota D.C. (CO)

(73) Assignee: EASY SOLUTIONS ENTERPRISES, CORP., Coral Gables, FL (US)

( * ) Notice: Subject to any disclaimer, the term of this patent is extended or adjusted under 35 U.S.C. 154(b) by 476 days.

(21) Appl. No.: 17/148,395

(22) Filed: Jan. 13, 2021

(65) Prior Publication Data

US 2022/0224683 A1 Jul. 14, 2022

(51) Int. Cl.
*H04L 9/40* (2022.01)
*G06N 5/04* (2023.01)
*G06N 20/00* (2019.01)

(52) U.S. Cl.
CPC ........... *H04L 63/0853* (2013.01); *G06N 5/04* (2013.01); *G06N 20/00* (2019.01); *H04L 63/0861* (2013.01)

(58) Field of Classification Search
CPC ........ G06N 20/00; G06N 3/044; G06N 3/045; G06N 5/04; H04L 2463/082; H04L 63/0861; H04L 63/0853
See application file for complete search history.

(56) References Cited

U.S. PATENT DOCUMENTS

| | | | |
|---|---|---|---|
| 2019/0065712 A1* | 2/2019 | Deutschmann | H04L 63/0807 |
| 2020/0244639 A1* | 7/2020 | Arif Khan | G06N 20/10 |
| 2021/0336952 A1* | 10/2021 | Margolin | H04L 63/1425 |

OTHER PUBLICATIONS

Alejandro Acien, et al., "Multilock: Mobile active authentication based on multiple biometric and behavioral patterns." 1st International Workshop on Multimodal Understanding and Learning for Embodied Applications, 2019.

(Continued)

*Primary Examiner* — Olugbenga O Idowu
(74) *Attorney, Agent, or Firm* — Greenberg Traurig

(57) ABSTRACT

In one approach, a method includes: receiving a reference login event input from a user, the reference login event input being associated with a first session of the user logging into an account; receiving a new login event input from the user, the new login event input being associated with a second session of the user logging into the account; accessing a machine learning model, wherein the machine learning model is trained using data selected based on a similarity of behavior between different users; and authenticating, with the machine learning model, the user for the account, based at least in part on the reference login event input and the new login event input. In examples, the reference and new login event inputs comprise one or more items of biometric data generated by interaction of the user in a web environment and/or a mobile environment for logging into the account.

20 Claims, 5 Drawing Sheets

(56) References Cited

OTHER PUBLICATIONS

Falaah Arif Khan, et al., "Behavioral biometrics and machine learning to secure website logins." International Symposium on Security in Computing and Communication, Springer, 2018.

Imane Lamiche, et al., "A continuous smartphone authentication method based on gait patterns and keystroke dynamics." Journal of Ambient Intelligence and Humanized Computing, 10(11), 2019.

Jesus Solano, et al., "Risk-based static authentication in web applications with behavioral biometrics and session context analytics." International Conference on Applied Cryptography and Network Security, Springer, 2019.

Jesús Solano, et al., "A few-shot practical behavioral biometrics model for login authentication in web applications." NDSS Workshop on Measurements, Attacks, and Defenses for the Web (MADWeb'20), 2020.

Mario Parreño Centeno, et al., "Mobile based continuous authentication using deep features." Proceedings of the 2nd International Workshop on Embedded and Mobile Deep Learning, 2018.

Romain Giot, et al., "Siamese networks for static keystroke dynamics authentication." IEEE International Workshop on Information Forensics and Security (WIFS), IEEE, 2019.

\* cited by examiner

ONE-SHOT BEHAVIORAL BIOMETRICS FOR LOGIN AUTHENTICATION USING MACHINE LEARNING MODEL

FIELD OF THE TECHNOLOGY

At least some embodiments disclosed herein relate generally to user authentication, and more particularly to, biometrics-based user login authentication using machine learning models.

BACKGROUND

Traditional password-based authentication techniques are popular with applications such as apps and online services executing in various computing environments (e.g., desktop environment, mobile environment). Such authentication can be performed either in a static manner (e.g., requiring authentication once per user login), or a continuous manner (e.g., requiring continuous authentication in an on-going session after a user has been authenticated for initial access). For example, financial institutions oftentimes offer their customers online access to services via web-based portals. However, such password-based authentication mechanisms are susceptible to various attacks. For example, overly simple passwords are subject to brute-forcing and guessing by malicious parties; and complex passwords can nevertheless be stolen during data breaches, or spoofed by domain specific malwares targeting financial institutions.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
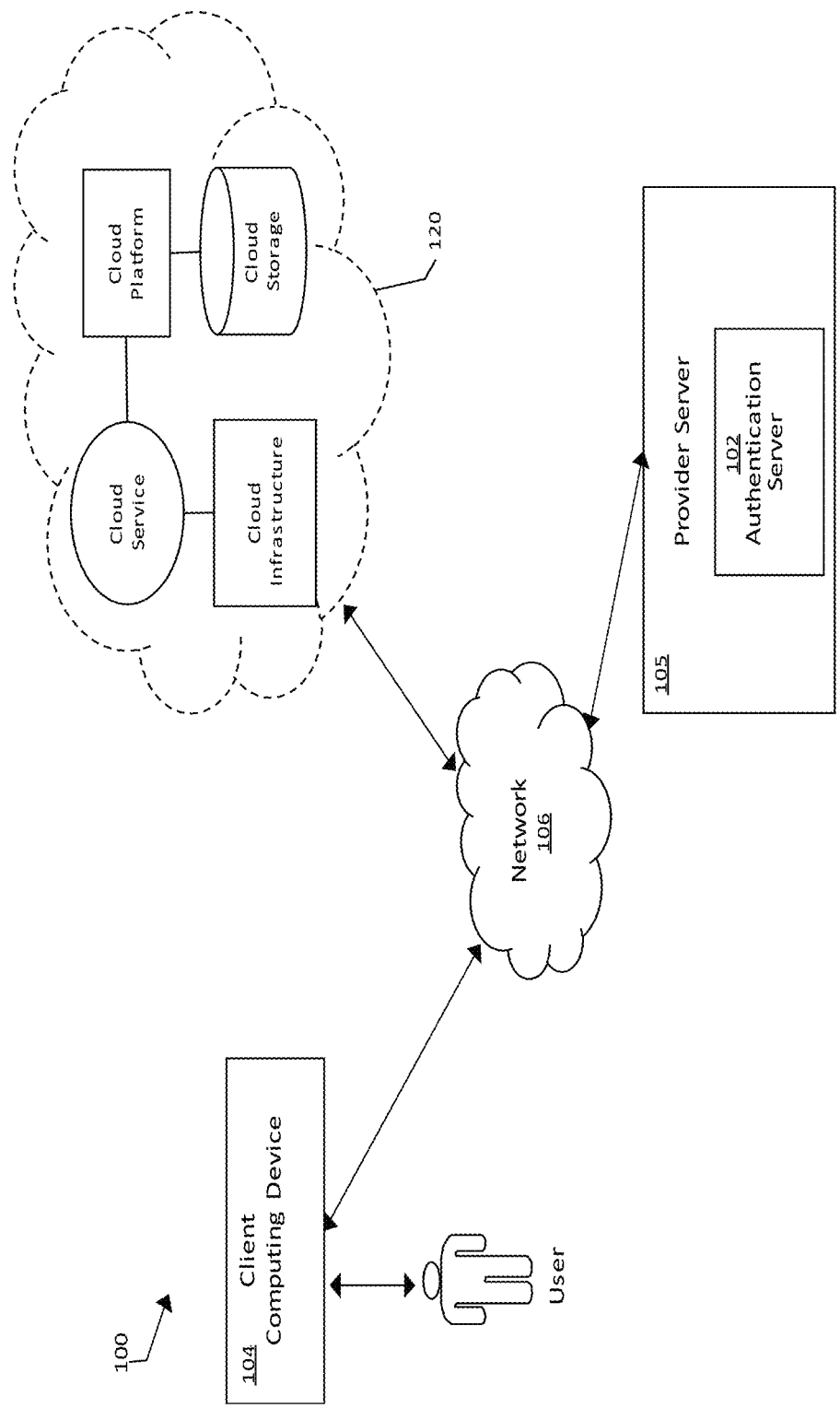
FIG. 1 shows an exemplary computing environment that may be used in conjunction with various embodiments of the present disclosure.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Embodiments of the present disclosure are used to authenticate users by assessing behaviors of persons that use a computer system (e.g., behaviors such as keyboard strokes, mouse movements, characteristics associated with the motion sensors of a computer system, touch screen inputs, etc.). Data for a first behavior is collected from a new user at the time of enrollment into a computer system. Data for a second behavior is collected from an unknown person (e.g., allegedly the new user) that is attempting to log into the computer system at a subsequent time by providing authentication credentials. The data for the first and second behaviors is analyzed to determine if the person attempting to log into the computer system is the same person as the new user that originally enrolled into the computer system.

Embodiments of the present disclosure authenticate a user after only one observation of a new user performing a login session at a computer system. In one example, this one observation is the enrollment behavior of the new user described above at a computer system. From the perspective of a machine learning model disclosed herein, this one observation of behaviors of the new user functions as a one-shot inference for authenticating the new user that originally enrolled at the computer system with a new login behavior. Further, although one observation suffices to enable the machine learning model to authenticate the new user, the machine learning model disclosed herein also is capable of authenticating the new user by comparing a new behavior with many user's behaviors stored in a database (e.g., few-shot inference).

Embodiments of the present disclosure use a Siamese neural network to perform the above analysis by comparing the first and second behaviors. The data for the first and second behaviors is the input to the neural network. The output from the neural network is used to determine whether the person attempting to log into the computer system is authentic. In one embodiment, the output is simply either that the user is authenticated, or that the user is not authenticated. In doing so, whether two behaviors belong to the same user is assessed.

According to some embodiments of the disclosure, the training of the Siamese neural network is performed using data from a population of prior users. The training data may include data regarding behaviors of the prior users when they are using a same or different computer system. Specifically, the training is done using so-called positive pairs of data and negative pairs of data. The positive pairs includes data collected for the same user at two different times. For example, the behavior data for the same user is collected at two different times (e.g., different days) for which the user has logged into the system. In the example of the new user above, the training data uses behavioral data from prior users other than the new user. In other words, behavioral data for the new user is not used to train the neural network.

According to some embodiments of the disclosure, the negative pairs may include data collected for different users. Each negative pair of data includes data for a first user and data for a second user. For example, the data for the first and second users can be behavior data when the first and second users are each logging into the computer system.

According to some embodiments of the disclosure, the training data for the negative pairs may be selected so that the behavior of the first and second users for each negative pair is "closely" similar. Although positive pairs can be randomly selected from a behavior data set, negative pairs are selected by choosing a negative pair of behaviors which have a high similarity, but still belong to different users.

According to some embodiments of the disclosure, negative pairs may be made by selecting input user behavior from a population of behavior data. The input user behavior is from different users in the population. As mentioned above, it is desired that the behavior pairs include behavior for closely similar behavior. In one embodiment, closeness in behavior is determined by calculating the Euclidean distance of the behavior input features and choosing the closest negative sample. For a given user, the closest negative sample is the behavior belonging to a different user in a database which minimizes the Euclidean distance to the behaviors of the given user. In other words, a closest negative sample is the most similar behavior to user's samples that still belongs to a different user.

According to some embodiments of the disclosure, in order to perform training using a large behavior training data set/database, pre-clustering of behaviors in the training data set is performed. The closest negative samples are determined as described above, but the set of behaviors from which different behaviors can be selected is limited, making the search of closest negative easier. Specifically, this limited behavior data is behavior data that falls in a common cluster. These clusters are determined from the training data set by a pre-cluster relation process using a density-based spatial clustering of applications with noise over the original input behavior features for all users in the behavior database, or other clustering methods (e.g., K-means, Hierarchical clustering, etc.). In some embodiments, closest negative samples may be selected in an online manner in the training phase without pre-clustering.

At least some embodiments disclosed herein may authenticate a user based on biometric data collected from the user performing a login session to access, for example, an account of the user. As used herein, a login or login session includes a process through which a user is authorized for accessing resources (e.g., services, applications, databases, cloud based functionalities). During the login session, the user may generate one or more login event inputs to provide, for example, login credentials such as a pair of username and corresponding password as part of the login process. In doing so, the user may interact with one or more input devices associated with a client device (e.g., a desktop computer, a laptop computer, a mobile device, etc.) on which the login is performed. In some embodiments, the user may interact with a keyboard of the client device to enter the credential, interact with a mouse at various points of time in relation to or independent from interacting with the keyboard, interact with a touch screen of the client device, interact with the client device itself (e.g., holding), interact with a gesture recognizing device of the client device, interact with a voice recognizing device or the client device, or otherwise interact with the one or more input devices to login to the account.

In some embodiments, a service provider and/or a third-party security service collects and records data associated with login event inputs obtained from user login sessions. For example, a service provider and/or third-party security service may monitor and record information including user biometric data generated by the user interacting with the above-described input devices during logins. For example, biometric data may include one or more of the biometric data related to keyboard events, biometric data related to mouse events, biometric data related to motion sensors on the client device, biometric data related to touch events, and biometric data related to other input device events (e.g., any types of human-machine interaction events).

Using a single reference biometric data associated with a prior session of the user logging into the account, a trained machine learning model is able to authenticate the user based on the biometric data collected during a new user login session, in addition to or independent of the authentication based on the verification of the matching of the username to the password.

The embodiments of the present disclosure provide advantages and improvements over conventional biometrics based user authentications. First, in some embodiments, with a single reference login behavior, the machine learning model is able to predict, for a new login behavior, whether the two login behaviors are sufficiently similar and therefore incurred by the same user logging into a computer system. Trained with a large set of prior other users' behaviors associated with logging into computer systems to learn similarity based on the features specific to the domain of user's login behaviors, the machine learning model does away with the conventionally required training with a particular user's historic login behavior to authenticate new login behaviors. Despite the fact that there are techniques allowing a relatively small number of threshold number (e.g., about 3 to 7) of training sessions be utilized to train a machine learning model on a per user basis, such authentication nevertheless incurs exposure to security risks associated with collecting training data, although typically a relatively small amount, from each user in order to authenticate them in their subsequent login attempts.

On the contrary, in various embodiments, the machine learning model disclosed herein leverages a trained, domain feature specific sensitivity to similarity for accurate authentication of a user's subsequent login attempts based on a single reference login behavior of the user. By virtue of its one-shot inference nature, the authentication disclosed herein incurs usage of less computation resources in collecting training data for each user and therefore achieves a further enhanced scalability in terms of servicing a large population of users associated with a service or application. Second, with a selection of hard pairs of training data towards heightened sensitivity to the similarity among behavior patterns of different users and/or to the dissimilarity among behavior patterns of the same user, the machine learning model authenticates users during a login process with higher accuracies. Third, the authentication model disclosed in some embodiments may include an authentication model trained for a web environment (e.g., the user interacts with a desktop-like computer) and/or an authentication model trained for a mobile environment (e.g., the user interacts with a mobile device) such that the machine learning models are customarily trained for authentication of users in different computing environments. Fourth, in some embodiments the authentication model can be applied in both a web environment and a mobile environment such that a unified machine learning model is applicable across various computing environments, in which a variety of applications and services execute. As such, when it comes to authentication, there is no need to modify or retrain to make adjustments for a user's habitual or otherwise engaged computing environment to login and interact with the applications and services. Lastly, the machine learning model disclosed herein can be applied in conjunction with other authentication models. For example, the machine learning model can be applied with models that analyze and profile users based on a computer IP address, geo-address, browser fingerprint information, login time patterns, etc.

Referring now to FIG. 1, an exemplary computing environment 100 that may operate in conjunction with embodiments of the present disclosure is depicted. The components of the computing environment 100 may be implemented using any desired combination of hardware and software components. Alternatively, or additionally, system 200 of FIG. 5 (or any portion thereof) may be included in the computing environment 100.

In the example shown in FIG. 1, the exemplary computing environment 100 may include a client computing device 104, a provider server 105, an authentication server 102, and a cloud component 120, which communicate with each other over a network 106.

The client computing device 104 may be any computing device such as desktop computers, laptop computers, tablets, PDAs, smart phones, mobile phones, smart appliances, wearable devices, IoT devices, in-vehicle devices, and so on. According to various embodiments, a user of the client computing device 104 performs a login session in order to access the services at the provider server 105.

The client computing device 104 may include one or more input devices or interfaces for the user of the client computing device 104 to interact therewith. For example, the one or more input devices or interfaces may include one or more of: a keyboard, a mouse, a trackpad, a trackball, a stylus, a touch screen, a hardware button of the client computing device 104, and the like. The client computing device 104 may be configured to execute various applications such as a web browser application to access the network 106.

Provider server 105 may be any computing device configured to host one or more applications/services. In some embodiments, the provider server 105 may require security verifications before granting users the access to the services and/or resources provided thereon. In some embodiments, the applications/services may include online financial services through which users may engage once authenticated for access via logging into their online accounts. In some embodiments and as shown in FIG. 1, the provider server 105 may be configured with an authentication server 102 for authenticating users. In other embodiments, an authentication server 102 may be configured remotely and/or independently from the provider server 105.

Authentication server 102 may be any computing device configured to authenticate various users based on the biometric data collected during their logins according to some embodiments of the present disclosure. In various embodiments, the authentication server 102 may be configured as part of the provider server 105 (as shown herein and described above), independent/remotely from the provider server 105, at the client computing device 104, or at any computing device that is peer to the client computing device 104 (e.g., other client computing devices).

Network 106 may be any type of network configured to provide communication between components of system 100. For example, network 106 may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of system 100. In other embodiments, one or more components of system 100 may communicate directly through a dedicated communication link(s).

In various embodiments, the computing environment 100 may also include one or more cloud components 120. Cloud components 120 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of the provider server 105 and the authentication server 102 may be configured to operate in or with cloud computing/architecture such as: infrastructure a service (IaaS), platform as a service (PaaS), and/or software as a service (SaaS).

While only one client computing device 104, provider server 105, authentication server 102, cloud component 120, and network 106 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

According to various embodiments, during a session, the user logs into an account of the user via an online application (e.g., a portal, a web page) at a client computing device, and the user generates one or more login event inputs at the client computing device. In some embodiments, the user provides the credential associated with the account via one or more input devices or interfaces of the client computing device. In some embodiments, the user enters the credential via input devices such as a keyboard, a mouse, a trackpad, a trackball, a stylus, and the like. In other embodiments, for example, where the client computing device is a mobile device, the user enters the credential via interfaces such as a touch screen, voice recognition device, gesture recognition device, embedded buttons of the client computing device, and the like. As used herein, a user performs a login session in a web environment when the user, for example, interacts with a web page or an application in a computing environment such as a desktop computer, a laptop computer, and the like. On the other hand, a user performs a login session in a mobile environment when the user, for example, interacts with a web page or an application in a computing environment such as a mobile phone, an iPad, a smartwatch, a wearable device, an in-vehicle device, an Internet of Things (IoT) device, and the like.

According to various embodiments, one or more login event inputs may include one or more items of biometric data associated with a user while generating the inputs during a login session. Sequences of prior users' raw machine-user interaction data may be transformed to sets of features to train a machine learning model to authenticate a new user for login attempts with a single reference login behavior of the new user. In some embodiments, such sequences of raw biometric information may comprise a behavior atom of a fixed length of machine-user interaction time window. In some implementations, a behavior atom is a sequence of interactions in a smallest time window (e.g., a fixed time duration of 3 seconds) that represent the user's login behaviors accurately, and hence can be used to train a machine learning model to authenticate the user with a satisfactory confidence score (e.g., a pre-configured confidence score) or an error tolerance score. In various embodiments illustrated herein, a behavior atom may comprise a sequence of interactions a user performs in a single login session at a computing device in web environment or a mobile environment. In some embodiments, a behavior atom may comprise a sequence of interactions a user performs in few or a few login in web environment or a mobile environment. In various embodiments, sequences of raw biometric data are transformed to extract respective features associated therewith to train the machine learning model. The following illustrates exemplary features and feature transformation associated with the user performs login sessions using examples for both a web environment and a mobile environment.

Web Environment Biometric Data Feature Engineering

In some embodiments, in order to collect a user's biometric data from the human-machine interaction during the user login session in a web environment, mouse movements and keyboard strokes performed by the user during the login can be obtained. In one example, the user biometric data is prior user data used to train a neural network, which can then authenticate a new user as discussed above. Further, such user biometric data may also be similarly obtained and processed for a new user (e.g., during the new user's reference login session (e.g., enrollment), and/or during the new user's new login session for authentication). Various suitable techniques may be applied to track mouse movements and keystrokes incurred by the user at the client computing device at which the user performs login sessions. In some embodiments, a Javascript code can be embedded in a login webpage to track mouse dynamics and/or keyboard dynamics. In other embodiments, a software module plug-in downloaded and installed by the user to the client computing device is used to track mouse movements and/or keystrokes. In one implementation, the mouse event data and/or the keystroke event data may be aggregated on the client side for further analysis.

Mouse movement data collected via a tracking tool provides a multitude of information regarding the mouse movement. For example, raw mouse movement data may include the location of the mouse (e.g., in terms of pixels), timestamps, types of interactions (e.g., movements such as hovering, hovering duration, mouse clicks of right clicks, left clicks, double clicks, etc., drag drop, and the like). In some example, high level abstraction such as heat maps and playbacks can be generated based on raw mouse movement data.

In one embodiment, the above-described raw mouse movement data collected from the user login session is represented as a plurality of tuples of a pair of a timestamp and a cartesian coordinate of the mouse. Based on the plurality of tuples of mouse movement data, various analysis can be performed to extract mouse movement features associated with the user performing a login into an account.

In some embodiments, a two-dimensional movement space of 360 degrees is identified as the mouse movement space, which is segmented into a plurality of distinct directions of movements. According to various embodiments, the mouse movement space can be segmented into any number of directions. In some embodiments, the plurality of distinct directions segments the mouse movement space evenly. In other words, each of the plurality of the directions separates from others by the same amount of degree. In other embodiments, a direction of the plurality of distinct directions may be separated from another direction of the plurality of distinct directions by different degrees. That is, the plurality of directions are not evenly distributed across the 2D space of 360 degrees. In one implementation, the plurality of distinct directions includes eight (8) distinct directions evenly segmenting the mouse movement space, separated from each other by 45 degrees. In one example, a first set of mouse features is generated to correspond to average speed values in each of the 8 segmented directions. Further, a second set of mouse features is generated to correspond to a proportion of movements performed in each of the 8 segmented directions, during a single behavior atom (e.g., a single login session). As such, for a single behavior atom, a set of 16 features are generated as abstraction for the raw mouse dynamic data.

In some embodiments, a set of timing-related features associated with the keyboard strokes by the user during a login session is used to extract a unique typing patterns or rhythms for the user. Such timing-related features may include the timing information related to the time when a key of a keyboard is pressed or released during the user login session. For example, raw keyboard stroke data may be represented as tuples of: a timestamp, a key identifier, and a key action (e.g., press or release). In one embodiment, the raw keyboard stroke data is anonymized for analysis. Any suitable anonymization techniques (e.g., differential privacy, secure multi-party computation, etc.) can be applied herein. In one implementation, for a keyboard with the traditional design of layouts (e.g., sections and zones), the keyboard is unified into a unique zone to provide an abstraction over the particular keys typed (e.g., keys typed to enter a login credential of the user) thereat.

In one example, for a key being pressed and subsequently released, four (4) set of keyboard features are captured: a key down-up feature computing a time duration from the point of time when a key is pressed down, to the point of time when the same key is released into an up position; a key up-down feature computing a latency from the point of time when a first key is released into an up position, to the point of time when the second key (e.g., the next key) is pressed down; a key down-down feature computing a latency from the point of time when a first key is pressed down, to the point of time when a second key (e.g., the next key) is pressed down; and a key up-up feature computing a latency from the point of time when a first key is released into an up position, to the point of time when a second key (e.g., the next key) is released into an up position.

In one example, one or more of a mean, standard deviation, and median of the above-described four timing metrics are computed to generate a vector of keyboard features, for a behavior atom. In this example, a vector of keyboard features includes 12 features (e.g., three values associated with the four timing related metrics).

Mobile Environment Biometric Data Feature Engineering

In some embodiments, a user engages a mobile environment to log into an account of the user via an application executing thereon. Given the nature of a mobile environment, the user no longer interacts with a mouse or a keyboard to provide the login credentials required for authentication. Instead, user may input information or otherwise interaction with the computing device via modalities such as a touch screen, a stylus, a voice recognition device, a gesture recognition device, and the like, during a login session.

In some embodiments, in order to collect prior users' biometric data from the human-machine interactions during the prior users' login sessions at a mobile environment, various motion sensor data and/or touch inputs performed by the prior users during the logins can be obtained. Various suitable techniques may be applied to obtain motion sensor data and touch event data generated by the prior users at the client computing device at which the user performs login sessions. On the other hand, for a new user at a mobile environment, such biometric data may also be similarly obtained and processed from a login session as a single reference biometric data, as well from another login session as the new biometric data for authentication.

In some embodiments, raw sensor data collected via various sensors associated with a mobile device provides a multitude of biometric information regarding how the user interacts at modalities associated with a mobile environment. By way of non-limiting examples, biometrical information may be indicative of the characteristics of how the user holds, shakes a mobile phone, how the user touches a touch screen to operate the user interface (e.g., scroll up, scroll down, tap, double tap, swipe in any directions, pinch, spread, long press, drag, etc.), how the user utilizes a stylus to touch a touch screen, how the user speaks to a phone, how the user makes contact-less gesture upon the phone (e.g., wave, cover, thumb up, etc.), how the user interacts with a soft keyboard, how the user exhibits a combination of characteristics (e.g., how the user holds the phone with one hand and operates the touch screen with another hand, how the user holds the phone and operates the touch screen with one hand, how the user holds the phone when speaking to Siri, etc.), and so on.

According to various embodiments of the disclosure, motion sensors may include one or more of inertial sensors such as a gyroscope, a magnetometer, and an accelerometer. As to touch events, any suitable techniques may be applied to obtain touch generated data. For example, features associated with a touch event may be captured by light sensors (infrared grid sensor, other optical sensors), capacitive sensors, resistive sensors, surface acoustic wave sensors, and the like.

In some embodiments, during the login session corresponding to a behavior atom, biometric data associated with both motion sensors and user touch events are obtained. In one example, motion sensor data is obtained using one or more of three types of sensors: a gyroscope, a magnetometer, and an accelerometer. For each sensor of each type, data is obtained in the axis of X, Y, and Z to generate 9 sequences of sensor measurements associated with a behavior atom. Based on the sequences of sensor data, various analysis can be performed to extract user's behavioral features (e.g., smartphone holding angle, etc.) associated with the user interacting with a mobile device while performing a login into an account. In one implementation, one or more of a mean, standard deviation, median, minimal, and maximal values of the above-described nine sequences of sensor data are computed to generate a vector of sensor features, for each behavior atom. In this example, a vector of sensor features includes 45 features (e.g., five values associated with the nine sensor metrics).

In some embodiments, touch features are extracted so as to represent characteristics of a user's finger-in-screen interactions at the mobile device. In some embodiments, touch event data is captured to record a touch's center position, the touch's pressure amount, and a touch's size. Based on such touch data, various analysis can be performed to extract user's touch pattern associated with the user interacting with a mobile device while performing a login into an account. In one implementation, for one touch (e.g., a finger down-up interaction of the user), one or more of a mean of a touch duration, a number of changes in the pressure and/or touch center in the touch, a standard deviation of the center position in the touch, and mean of a touch size (e.g., a finger size, a size of portion of a finger-tip) values of the above-described four features of touch inputs are computed to generate a vector of touch features.

In some embodiments, touch features relating to touches performed on a soft keyboard, or the like, displayed on a touch screen of the mobile device can be further extracted to be included in the above-described touch features. In one implementation, two (2) features are obtained based on a latency between consecutive touches of the user. Such latencies may include one or more of the key features of a key up-down, up-up, down-up, and down-down with the above-described embodiments for a web environment. In one example, the latency is a key up-up feature computing a latency from the point of time when a first key is released into an up position, to the point of time when a second key (e.g., the next key) is released into an up position. In one example, such a key up-up feature is computed based on a timestamp associated with a key being released into an up position. In one example, two of a mean, standard deviation, and median of the above-described key timing metrics are computed to generate a vector of soft keyboard features.

In one example, biometric touch data is abstracted into a vector of touch features including 7 features (e.g., 5 touch features and 2 keyboard features).

In some embodiments, the motion sensor data feature vector and the touch event data feature vector is fused to generate a single mobile environment biometric data feature vector. In one example, such a fused vector includes 52 features (45 sensor features, 5 touch features, and 2 keyboard features). In various embodiments, the motion sensor data features, the touch features may be fused with other biometric features in combination, or independent of each other, without limitations.

In some embodiments, various feature abstractions are performed at the computing environment in which a user attempts to login. This way, the user's personal data (e.g., password patterns) and privacy may be protected. In other embodiments, raw biometric data may also be transmitted to a server for transformation when privacy or security concerns are addressed already. In various embodiments, the user may be a user of a population of prior users, or a new user (e.g., a user not belonging to the population of prior users) for whom authentication is performed based on a single reference login thereof.

Figure 2:
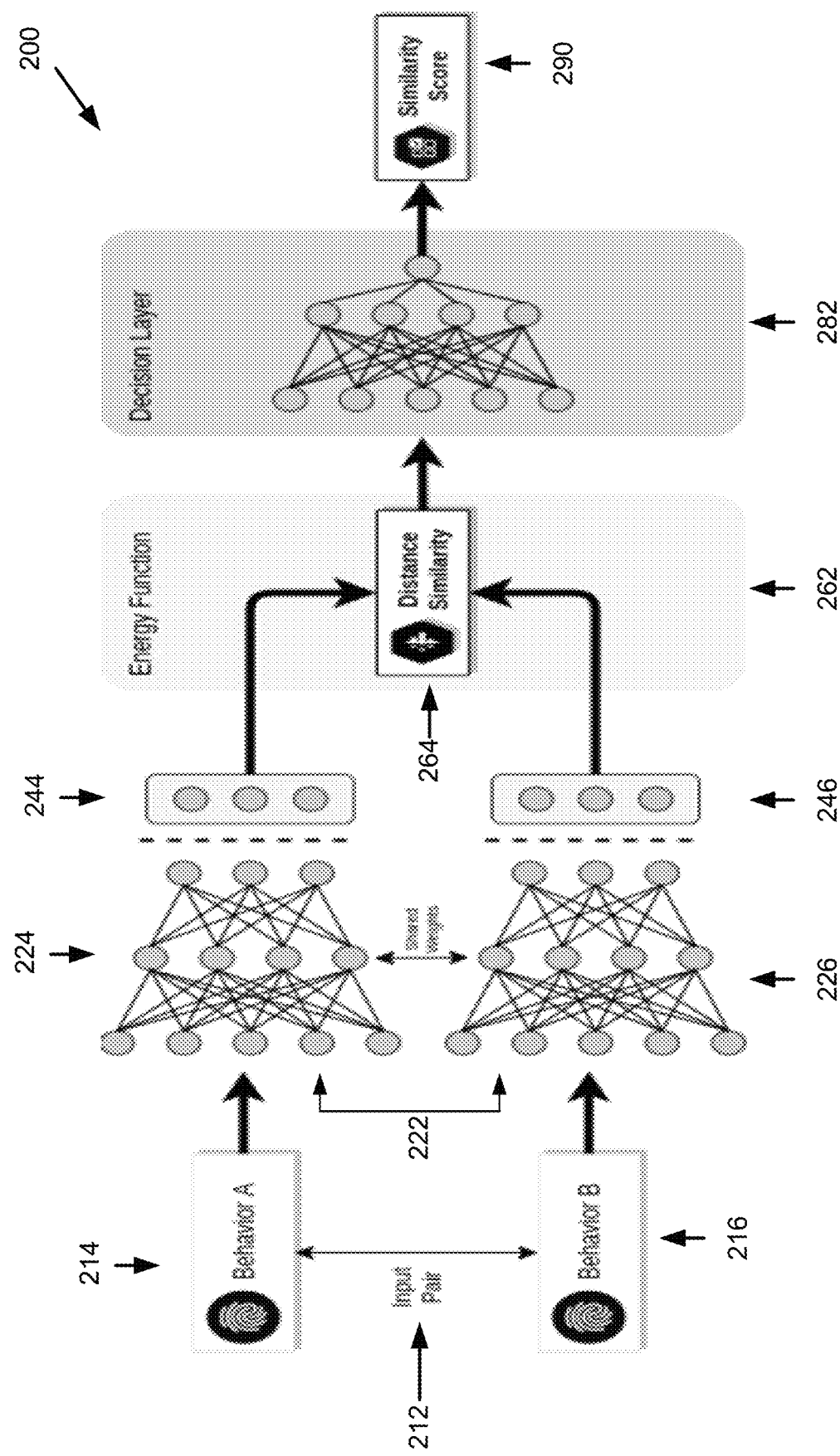
FIG. 2 shows an exemplary one-shot machine learning model architecture according to various embodiments of the present disclosure.

FIG. 2 illustrates an exemplary machine learning model architecture according to some embodiments of the disclosure. As illustrated, in one embodiment, a machine learning model 200 is configured to receive an input pair 212, and output a similarity score 290. The input pair 212 includes first behavior data (Behavior A) 214 and second behavior data (Behavior B) 216. The similarity score 290 indicates whether or not the first behavior data 214 and the second behavior data 216 is associated with the same user performing logins (e.g., a first login attempt by a new user after enrollment). In some embodiments, the similarity score may be of a value between 0 and 1. In some embodiments, the similarity score 290 may be a binary classification indicating whether the user can be authenticated based on the pair of input data. In other words, when the machine learning model 200 concludes that the first behavior data and the second behavior data are similar enough to be considered as belonging to the same user, the user is authenticated successfully, in addition to or independently of being authenticated using the login credentials. On the other hand, when the machine learning model 200 concludes that the first behavior data and the second behavior data is not similar enough to be considered as belonging to the same user performing the login sessions, the user is not authenticated successfully.

In some embodiments, the first behavior data 214 is obtained in a single session in which the user (e.g., a new user) has performed a login. In implementations, a single login session may include an enrollment session, in which the user signs up to create a set of login credentials (e.g., a pair of login username and login password) at the computing device. In some embodiments, such a single login session may be any session associated with the user's past logins. As such, the first behavior data 214 is the reference interaction information collected from the user during a single observation session. In one example, data 214 is data collected from activity by the user when creating an account on a computer system. On the other hand, the second behavior data 216 is a new login session on which the machine learning model is to draw a conclusion with regard to whether the user of the new login can be authenticated as the user associated with the reference login. In one example, the second behavior data 216 is the behavior data collected during the user's first attempt to access the computer system after creating the account.

In the embodiment illustrated herein, the machine learning model 200 uses a Siamese neural network 222 to compute the similarity between the first behavior data 214 and the second behavior data 216. The Siamese neural network 222 comprises a first sub-network 224 and a second sub-network 226. In some embodiments, the first sub-network 224 is identical to the second sub-network 226. In one implementation, the first sub-network 224 and the second sub-network 226 share the same weights for processing the input data. As shown herein, the first sub-network 224 is configured to process the first behavior data 214; while the second sub-network 226 is configured to process the second behavior data 216. In some embodiments, the first sub-network 224 and the second sub-network 226 are not identical, but similar to each other to various degrees.

In some embodiments, one or both of the first sub-network 224 and the second sub-network 226 may be configured as a fully-connected network. In some embodiments, the two sub-networks 224 and 226 are configured as feature extractors to analyze the input behavior data to generate a first feature vector 244 and a second feature vector 246, respectively. In some embodiments, the sub-networks 224 and 226 are configured to analyze the input behavior data to abstract features in the latent space. Various embodiments herein may be configured such that one or both of the first sub-network 224 and the second sub-network 226 output the respective feature vectors 244 and 246 that are bounded by an energy function 262. Such an energy function may be any suitable algorithm that assigns low energies to the values indicating a high likelihood that the features belong to the same user, and higher energies to the values indicating a low likelihood of that the features belong to the same user. Using such an energy based model, a loss function, minimized during training, is used to measure the quality of the energy functions.

In one implementation, the energy function 262 is configured as a distance 264 (e.g., distance similarity 264) between the first feature vector 244 and the second feature vector 246 in the latent space. Such a distance can be computed using any suitable techniques. In some embodiments, the distance similarity 264 may be an L1 distance. In some embodiments, the distance similarity 264 may be an L2 distance, a Cosine Similarity, a Manhattan distance, and the like. Accordingly, a relatively large value of the distance 264 may indicate that the dissimilarity degree is high, therefore it is more likely that the first behavior data 214 and the second behavior data 216 belong to two different users performing logins. On the other hand, a relatively small value of the distance 264 may indicate that the dissimilarity degree is low. In the latter case, it is more likely that the first behavior data 214 and the second behavior data 216 belong to the same user performing logins.

In the embodiment illustrated herein, a series of decision layers (e.g., decision network) 282 are configured to receive the computed distance 264 as an input, and to output an authentication decision 290. In some embodiments, the decision network 282 is a binary classifier and the authentication decision 290 is a binary decision (e.g., authentication conclusion) indicating whether the user can be authenticated based on the first behavior data 214 and second input data 216. In some embodiments, the decision network is a fully connected network. As the machine learning model 200 can receive the first behavior data 214 from a single login session (e.g., a login session of the user's initial enrollment) to predict whether the second behavior data 216 (e.g., the user's login subsequent to the enrollment) is associated with the same user, the user can be authenticated based on one-shot of biometric data (e.g., first behavior input data 214).

Figure 3:
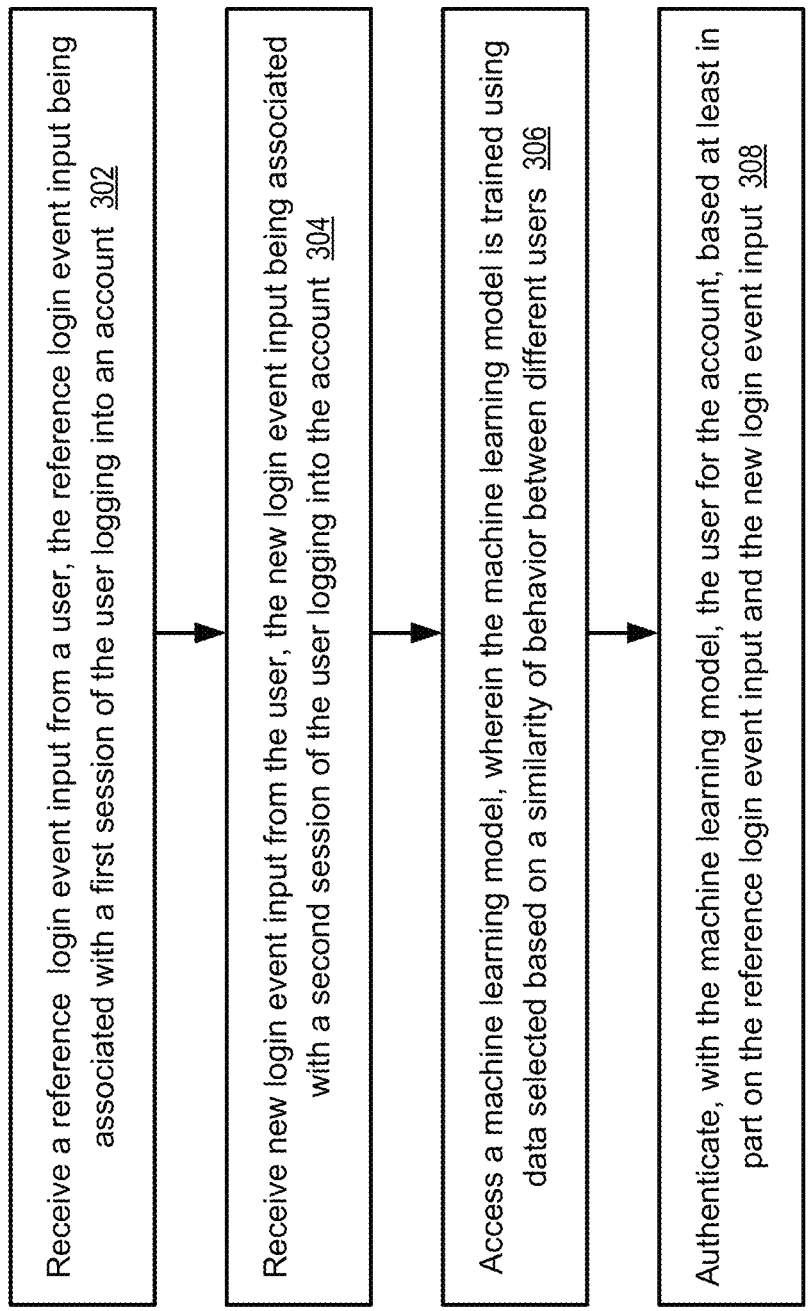
FIG. 3 shows a flowchart of an exemplary one-shot biometrics based user login authentication according to various embodiments of the present disclosure.

FIG. 3 shows a flowchart of an exemplary method for one-shot biometric data based user login authentication according to some embodiments of the present disclosure. Authentication for a user is initiated, at 302, by receiving a reference login event input from a user, the reference login event input being associated with a first session of the user logging into an account. In some embodiments, the login event input includes one or more items of biometric data associated with the user. In some embodiments, the one or more items of biometric data is generated by interactions of the user with one or more computing devices for logging into the account to communicate a login credential of the user. In some embodiments, the interactions are performed in a web environment, and/or a mobile device environment. In some embodiments, the one or more items of biometric data include one or more of: mouse event biometric data, keyboard event biometric data, motion sensor biometric data, and touch event biometric data. In some embodiments, the motion sensor biometric data is obtained using an inertial sensor including, for example, at least one of: a gyroscope sensor, a magnetometer sensor, or an accelerometer sensor. In some embodiments, the login credential includes a username and corresponding password.

At 304, a new login event input from the user is received, the new login event input being associated with a second session of the user logging into the account. In various embodiments, the second session is a new login session to be authenticated as described herein.

At 306, a machine learning model is accessed. In some embodiments, the machine learning model has been trained using data selected based on a similarity of behaviors between different users. In some embodiments, the machine learning model may be trained with login behavior data associated with a population of prior users' logins. In some embodiments, the machine learning model is trained with data that is user computing platform/environment neutral.

In some embodiments, the machine learning model includes a Siamese neural network and a decision network. In some embodiments, the Siamese network may be trained by positive pairs of training data and negative pairs of training data; or triplets of training data. The decision network model may be trained to generate an authentication result based on a similarity distance computed using the Siamese network. In some embodiments, the decision network is a binary classifier. In some embodiments, a positive pair of biometric data may be a pair of two login behaviors associated with the same user during different sessions to login an account. A negative pair of biometric data may be a pair of two login behaviors associated with two different users during different sessions to login accounts. In some embodiments, a positive pair of the positive pairs of training data is a hard positive pair of training data, and/or a negative pair of the negative pairs of training data is a hard negative pair of training data. In some embodiments, the negative pairs of training data comprises a closest negative pair of training data selected based on an Euclidean distance representing a degree of similarity between login features of the user and login features of another user. In some embodiments, a triplet of training data may be a semi hard triplet of training data, the details of which are described below with connection to FIG. 4.

At 308, the user is authenticated with the machine learning model, based on at least in part on the received reference login event input and new login event input. In some embodiments, authentication of the user for the account comprises initiating a process of secondary authentication for the user. In some embodiments, the authentication of the user includes application in conjunction with other risk-based authentication techniques. In some embodiments, authentication of the user for the account comprises granting the user access to the account upon successful authenticating the user as the legitimate user of the account. In some embodiments, authentication of the user for the account comprises denying the user access to the account upon failing to authenticate the user as the legitimate user of the account.

Figure 4:
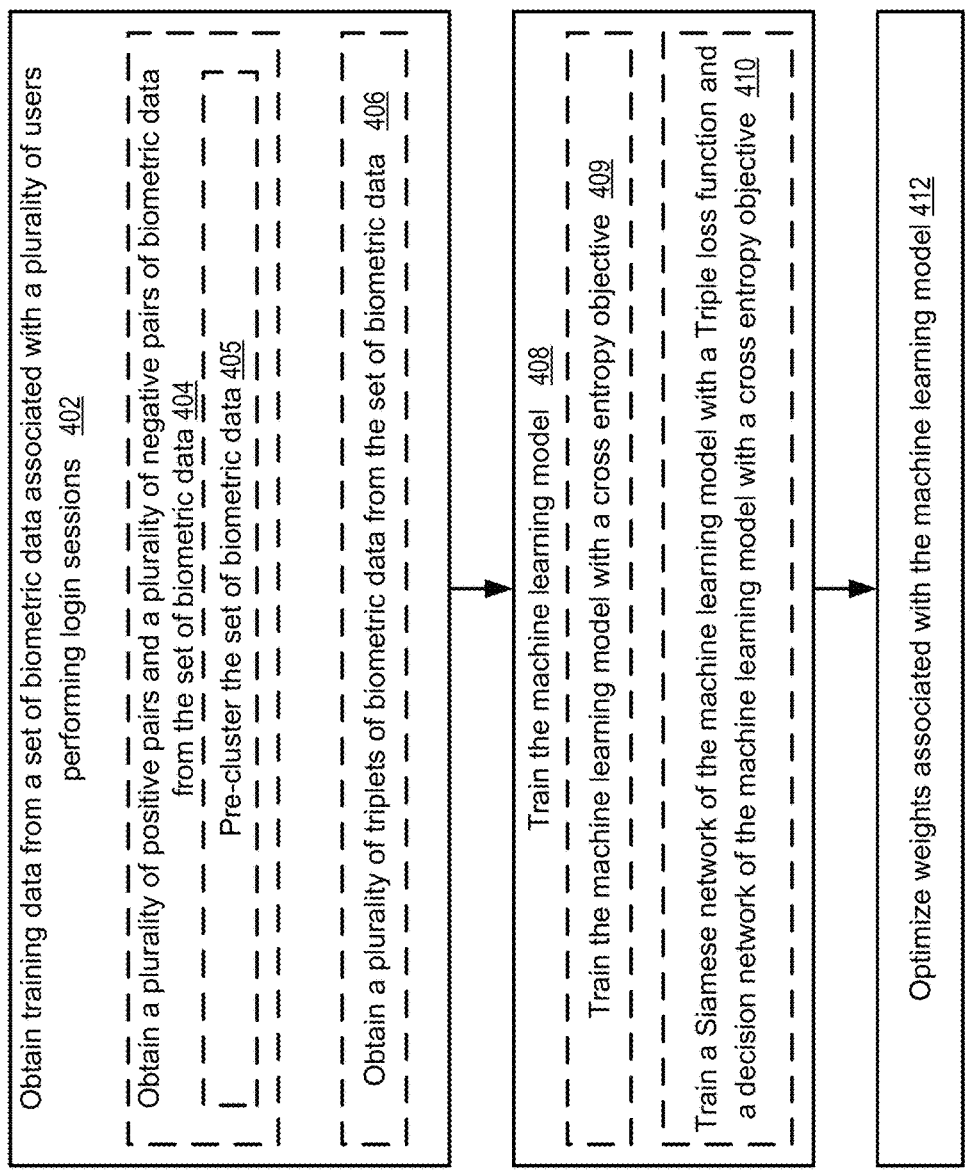
FIG. 4 shows a flowchart of an exemplary process for training a machine learning model for one-shot biometrics based user login authentication according to various embodiments of the present disclosure.

FIG. 4 shows a flowchart of an exemplary method for training the machine learning model for one-shot biometric data user login authentication, according to some embodiments of the present disclosure. The machine learning model may comprise any machine learning model capable of performing similarity based predictions. For example, the machine learning model may include a neural network, a deep learning neural network, and the like. The neural networks may be fully connected, or locally connected. In some embodiments, the machine learning model may be implemented by the machine learning model 200 of FIG. 2. In various embodiments, the machine learning model may be trained with biometric data associated with a group of users' login sessions. In some embodiments, such a biometric data training dataset comprises biometric data collected and transformed in a web environment and/or a mobile environment. In some embodiments, the machine learning model comprises a Siamese network of a first sub-network, a second sub-network and a similarity module (e.g., a conjoining layer) that compares the outputs from the first and second sub-networks to generate an output. One or both of the first and second sub-networks may be implemented by any suitable networks such as, for example, a multilayer perceptron (MLP), a convolutional network (CNN), a long short time memory (LSTM), and the like.

In implementations, an MLP may utilize a plurality of layers designed to address the recognition of biometric data inputs associated with the same user performing login sessions. In some implementations, such configuration of layers may be customized according to various factors such as, for example, whether the biometric data is collected from a web environment or a mobile environment, what types of biometric data is collected, and/or how the raw biometric data is transformed into vectors of features, and the like. In one implementation, an MLP may utilize from about one (1) to six (6) hidden layers. In other implementations, an MLP may as well be deeper than conventional MLPs and apply layers of a larger number.

In some embodiments, the machine learning model may be fully connected. In some embodiments, the machine learning model may be locally connected. In some embodiments, the first and second sub-networks may be identical and have the same configuration with the same weights and other parameters. In some embodiments, the first and second sub-networks may not be identical and accordingly may not share the same weights and/or other parameters and hyper-parameters.

To predict the similarity between a reference biometric data input of a user and a biometric data input for authentication (e.g., the biometric data that may or may not belong to the same user associated with the reference data), the Siamese network is trained with biometric data associated with a population of prior users having performed login sessions using a computer system. In some embodiments, such training biometric data may be collected from the prior users who have logged into a same computer system or different computer systems. In some embodiments, the population of prior users does not include the user associated with the reference biometric data (the user-for-authentication). In some embodiments, the training biometric data of the prior users logging into the computer system may include the biometric data associated with the user for authentication during a previous login session.

Trained with the login behaviors of users other than a new user for authentication in a post-training phase, the machine learning model discerns the similarity between the new user's reference login behavior and a to-be-authenticated login behavior to determine whether those login behaviors are associated with the same new user. This way, unlike the conventional machine learning techniques, the machine learning model herein does not need to be trained per user (using each user's historic login behaviors) to gain knowledge of the features specific to a particular user in order to recognize that particular user with the learned features in a prediction phase. Accordingly, as long as the machine learning model is trained with behaviors of any prior users and there is a single reference behavior (e.g., enrollment login behavior data) available for a new user, the machine learning model is able to predict whether a behavior-for-authentication belongs to the new user.

In some implementations, raw biometric behavior data is collected from a population of prior users in a controlled setting and/or a uncontrolled setting. By way of non-limiting example, a controlled setting may be configured as a website designed to capture login events from a controlled population of users. Such users create their login credentials on the website and perform login sessions subsequently. Also by way of non-limiting example, a uncontrolled setting may be configured as a monitoring system associated with one or more websites of one or more service domains (e.g., financial institution's online service websites). In one example, the training data is collected from the prior users using different computing devices (e.g., different smartphones) to login at the websites.

In some embodiments, the collected raw training behavior data from a population of prior users is grouped for each user. In some implementations, for data collected from a controlled setting, the behavior data is merged for each user associated with the controlled setting into a historical session. In one example, such historic session is split into time windows of configured sizes (e.g., fixed time duration of about 5, 10, 20, 30, and 60 seconds) of interactions. For each time window, the above-described features (e.g., mouse, keyboard, motion sensor, touch, and the like) are abstracted. In some embodiments, for the raw data collected from a uncontrolled setting, the raw behavior data may be abstracted into features at the login device side for transmitting to a data collection server. In one implementation, the training data is collected from login sessions of arbitrary time durations. In some embodiments, the collected feature dataset is split by user, in a random or configured fashion. In other embodiments, the feature dataset may be split in other suitable fashion (e.g., train-test splitting scheme), without limitation. In the case of splitting the training dataset by user, it is made sure that a new login behavior and its respective reference login behavior provided to a trained machine learning model for authentication are not included in the training dataset.

In some embodiments, the Siamese network may be trained with pairs of behavior data (e.g., to train for pairwise similarity) of prior users performing logins to a computer system. Such pairs may be selected from the training dataset as described above. In some implementations, each behavior data of the training dataset is annotated with information of the respective user. Behaviors in a pair of training data associated with the same user are similar to each other (e.g., close in the feature space) and such a pair may be selected as a positive pair (e.g., the machine learning model's target authentication conclusion is positive in that the pair of data belongs to the same user). On the other hand, behaviors in a pair of training data collected from different users are not similar to each other (e.g., apart in the feature space) and such a pair may be selected as a negative pair (e.g., the machine learning model's target authentication conclusion is negative in that the pair of data does not belong to the same user). In some embodiments, training pairs may include one or both of positive pairs and negative pairs. The pairs of data may be processed by each of the first and second sub-networks to compute the similarity between the two training behavior provided in the pair.

In some embodiments, the Siamese network may be trained with a triplets of input data (e.g., to train for triplet similarity) of prior users performing logins to a computer system. Such triplets may be selected from the training dataset as described above. In some implementations, each behavior data of the training dataset is annotated with information of the respective user. Again, behaviors associated with the same user are similar to each other (e.g., close in the feature space) and considered as belong to the same group; while behaviors associated with different users are dissimilar to each other (e.g., apart in the feature space) and considered as belong to different groups. As such, a triplet may be formed with a reference behavior, a positive behavior, and a negative behavior. The positive behavior and the reference behavior belong to the same group; while the negative behavior and the reference behavior belong to different groups. In some embodiments, using triplet training data, the Siamese network may be trained with a Triple loss function so as to maximize the distance between the reference behavior and the negative behavior, and minimize the distance between the reference behavior and the positive behavior. As above-described, such a distance can be any suitable distance such as an L1 distance, an L2 distance, and so on.

As shown in FIG. 4, at 402, training data is obtained from a set of biometric data associated with a plurality of users performing login sessions. In some embodiments, at 404, a plurality of positive and a plurality of negative pairs of biometric data are obtained from the set of biometric data associated with a plurality of users performing login sessions. As above-described, a positive pair of biometric data may be a pair of two login behaviors (e.g., biometric data) associated with the same user during different sessions to login an account. In some embodiments, the positive pairs of datasets are selected randomly. For example, a positive pair may be generated by randomly selecting two different login behaviors associated with (e.g., labeled with the same user information). This way, such randomly selected positive pairs comprise behaviors of two different login sessions performed by the same user (e.g., the positive pairs may include biometric data collected from the same user at two different times (e.g., different days) when the user has logged into a system). In some embodiments, a positive pair of the positive pairs of training data is a hard positive pair of training data. In implementations, a hard positive pair of training data comprises data associated with two login behaviors that exhibit a positive distance larger than a threshold positive distance (e.g., with a maximal positive distance). In other words, these two login behaviors both belong to the same user of the plurality of users, and yet have a maximized Euclidean distance between each other (the most dissimilar behaviors of the same user).

In some embodiments, a plurality of negative pairs of biometric data are also obtained from the set of biometric data. A negative pair of biometric data may be a pair of two login behaviors associated with two different users during different sessions to login account(s). In some embodiments, the negative pairs of behaviors are selected randomly. For example, a negative pair may be generated by randomly selecting two behaviors labeled with different user information. This way, the randomly selected negative pair comprises behaviors each of which associated with a login sessions performed by two different users (e.g., the negative pairs may include biometric data collected for two different users at any time when the users logged into a system).

In some embodiments, a negative pair of the plurality of negative pairs of training data is a hard negative pair of training data. In implementations, a hard negative pair of training data comprises behaviors associated with two logins that exhibit a negative distance smaller than a threshold negative distance (e.g., with a minimal negative distance). In other words, such two login behaviors belong to two different users performing login sessions, and yet capture a small degree of dissimilarity (e.g., the pair including a first user's sample behavior, and another behavior most similar to the first user's sample behavior but belonging to a second user).

In some embodiments, a hard negative pair of training data is selected by computing an Euclidean distance between the behavior of the pairs such that a closest negative behavior is identified as:

$$b-=\mathrm{argmin}\ b\in\{B-Bu\}D(br,b)|D(br,b+)\leq D(br,b) \qquad (1)$$

where D is the Euclidean distance, B represents the set of biometric data (e.g., behaviors), Bu represents the behaviors associated with a set of users (U), br represents the randomly selected behaviors, and b+ represents the previous pair positively selected.

In some embodiments, at 405, the set of biometric data is pre-clustered into a plurality of clusters to make the search of the closest negative pair easier. In this case, a hard negative pair of training behaviors is generated by applying the above-described formula (1) to users in a common cluster such that the search of the closest negative pair is within a limited set of the biometric data. In implementations, the set of biometric data may be clustered via any suitable techniques such as, for example, density based spatial clustering of applications with noise over the original input behavior features, k-means, hierarchical clustering, multivariate normal distributions, for all of the plurality of users associated with the set of biometric data. In some embodiments, the pre-clustering is performed online by demand during the training phase of the machine learning model. In some embodiments, the pre-clustering is performed offline before or the training phase of the machine learning model.

In some embodiments, at 406, a plurality of triplet behaviors is obtained from the set of biometric data as the training dataset. The plurality of triplets may be selected from the set of biometric data as described above. In some embodiments, a triplet may be selected as a semi-hard triplet in order to train the Siamese network. In one implementation, such a triplet comprises a negative behavior that is farther from a reference behavior than a positive behavior, but still produces a positive loss.

At 408, the machine learning model is trained. In some embodiments, when a plurality of pairs of behaviors are used as training data, the entire machine learning model may be trained with a loss function of a cross entropy objective (e.g., binary cross entropy objective), at 409. In some embodiments, when a plurality of triplets of behaviors are used as training data, the Siamese network of the machine learning model may be trained with a triple loss function as above-described; while the decision network (e.g., binary classifier) of the machine learning model may be trained with a loss function of a cross entropy objective, at 410. In some embodiments, other suitable loss functions such as a contrastive loss function or a hinge loss function may be used to train one or more of the Siamese network, the decision network, and/or the machine learning model. In various embodiments of the disclosure, the machine learning model may be trained with the goal to compute the distance between the sample login behavior from the same user to be as small as possible, and those from different users to be as large as possible.

At 412, weights associated with the machine learning model are optimized. Before training, the output produced by the machine learning model is likely to be incorrect. As such, an error may be calculated between the actual output of the machine learning and the target output desired from the machine learning model. The weights of the machine learning model may then be adjusted such that the outputs of the machine learning model are more closely aligned with the target outputs. In some embodiments where the machine learning model is trained with the plurality of pairs of behaviors, the weights of the machine learning model may be adjusted based on training. In some embodiments where Siamese network and the decision network of the machine learning model are trained with separate loss functions, the weights of the two networks may be adjusted according to their respective training.

In some embodiments, any suitable techniques may be applied to adjust the weights. In some embodiments, the weights may be adjusted using a back propagation by adjusting the weights in a manner involving backward pass through the network. For example, a learning algorithm may compute a gradient vector for the weights. The gradient may indicate an amount that an error would increase or decrease if the weight were adjusted slightly. At the top layer, the gradient may correspond directly to the value of a weight associated with an interconnection connecting an activated neuron in the penultimate layer and a neuron in the output layer. In lower layers, the gradient may depend on the value of the weights and on the computed error gradients of the higher layers. In some embodiments, the weights are initialized following a normal distribution with zero-mean and standard deviation. In some embodiments, the weights may be additive over the tied first and second sub-networks. In some embodiments, the deviation is of a value of 0.01.

In some embodiments, one or both of the Siamese network and the decision network may be configured as fully connected networks. As such, one or more of layers of regularization (e.g., L2 regularization), normalization (e.g., batch normalization), and dropouts may be further configured for one or both of the Siamese network and the decision network. In some embodiments, the machine learning model may also be trained using an optimizing algorithm (e.g., Adam optimizer) to update network weights based on training.

Figure 5:
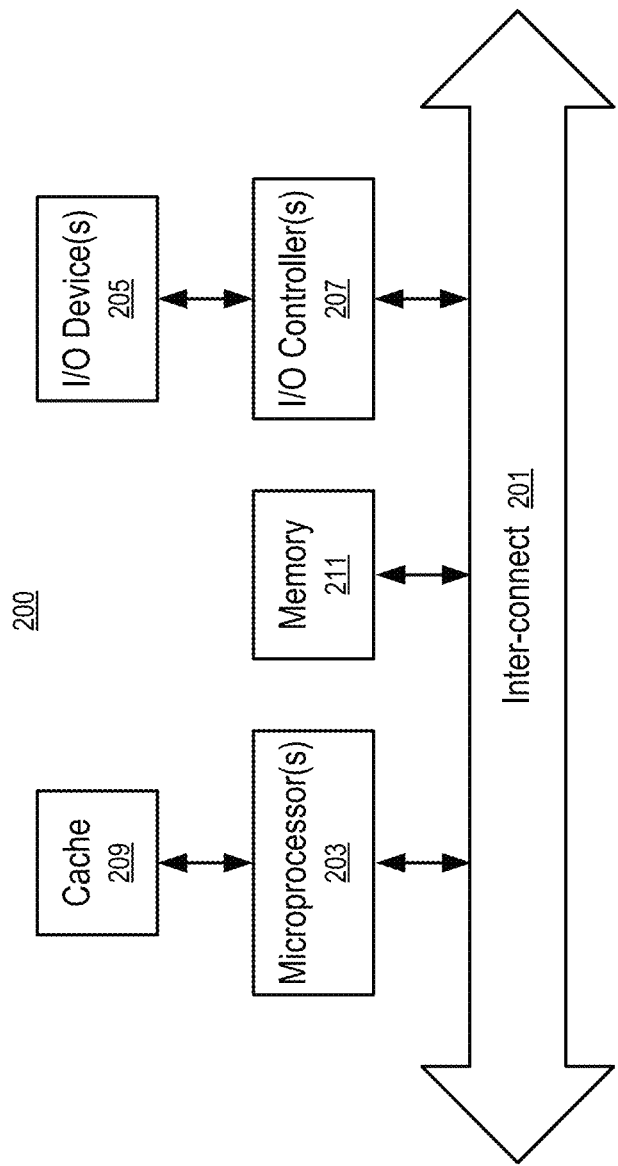
FIG. 5 shows an exemplary computing system that can be used to implement some components of embodiments of the present disclosure.

FIG. 5 shows a data processing system that can be used to implement some components of embodiments of the present disclosure. While FIG. 5 illustrates various components of a computer system, it is not intended to represent any particular architecture or manner of interconnecting the components. Other systems that have fewer or more components than those shown in FIG. 5 can also be used.

In FIG. 5, the data processing system (200) includes an inter-connect (201) (e.g., bus and system core logic), which interconnects a microprocessor(s) (203) and memory (211). The microprocessor (203) is coupled to cache memory (209) in the example of FIG. 5.

In FIG. 5, the inter-connect (201) interconnects the microprocessor(s) (203) and the memory (211) together and also interconnects them to input/output (I/O) device(s) (205) via I/O controller(s) (207). I/O devices (205) may include a display device (e.g., touchscreen display) and/or peripheral devices, such as mice, keyboards, trackpads, trackballs, styluses, modems, network interfaces, printers, scanners, video cameras and other devices known in the art. When the data processing system is a server system, some of the I/O devices (205), such as printers, scanners, mice, and/or keyboards, are optional.

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
receiving a reference login event input from a new user, the reference login event input being associated with a first session of the new user logging into an account;
receiving a new login event input from the new user, the new login event input being associated with a second session of the new user logging into the account;
accessing a machine learning model, wherein the machine learning model is trained using data selected based on a closest similarity of behavior between different prior users, wherein the prior users do not include the new user; and authenticating, with the machine learning model, the new user for the account, based at least in part on the reference login event input and the new login event input.

2. The method of claim 1, wherein the machine learning model is trained with login event input associated with a plurality of users logging into an account on a computer system.

3. The method of claim 1, wherein the new login event input comprises one or more items of biometric data associated with the new user.

4. The method of claim 3, wherein an item of the one or more items of biometric data associated with the new user is generated by interaction of the new user with an input device or a handheld device for logging into the account, the interaction communicating a login credential of the new user.

5. The method of claim 4, wherein the interaction is performed by the new user in a web environment, or a mobile device environment.

6. The method of claim 4, wherein an item of the one or more items of biometric data associated with the new user is keyboard event biometric data, mouse event biometric data, motion sensor biometric data, touch event biometric data, or hand gesture event biometric data.

7. The method of claim 6, wherein the motion sensor biometric data is obtained using an inertial sensor.

8. The method of claim 7, wherein the inertial sensor includes at least one of: a gyroscope sensor, a magnetometer sensor, or an accelerometer sensor.

9. The method of claim 6, wherein the keyboard event biometric data comprises a set of features associated with keystrokes of the new user during the second session.

10. The method of claim 6, wherein the mouse event biometric data comprises a set of features associated with dynamics of a mouse movement of the new user during the second session.

11. The method of claim 6, wherein the touch event biometric data comprises a set of features associated with touches of the new user on a handheld device during the second session.

12. The method of claim 6, wherein a vector of motion sensor features is fused with a vector of touch features to generate a vector of login features.

13. The method of claim 1, wherein the machine learning model is trained by a plurality of positive pairs of training data and a plurality of negative pairs of training data.

14. The method of claim 1, wherein the machine learning model comprises a Siamese neural network trained by a plurality of triplets of training data.

15. The method of claim 13, wherein a positive pair of the plurality of positive pairs of training data is a hard positive pair of training data, and a negative pair of the plurality of negative pairs of training data is a hard negative pair of training data.

16. The method of claim 13, wherein the prior users include a first user and a second user, the plurality of negative pairs of training data comprises a closest negative pair of training data selected based on an Euclidean distance representing a degree of similarity between login features of the first user and login features of the second user.

17. The method of claim 16, wherein the closest negative pair of training data is selected based on a pre-clustered set of training data.

18. The method of claim 14, wherein the plurality of triplets of training data comprises semi hard triplets of training data.

19. A non-transitory computer-readable medium storing instructions that, when executed, cause a computer system to:

receive a reference login event input from a new user, the reference login event input being associated with a first session of the new user logging into an account;

receive a new login event input from the new user, the new login event input being associated with a second session of the new user logging into the account;

access a machine learning model, wherein the machine learning model is trained using data selected based on a degree of similarity between behavior of a first prior user and behavior of a second prior user; and authenticate, with the machine learning model, the new user for the account, based at least in part on the reference login event input and the new login event input.

20. A system comprising:

at least one processor; and memory in communication with the processor and storing instructions that, when executed by the processor, cause the system to:

receive a reference login event input from a new user, the reference login event input being associated with a first session of the new user logging into an account;

receive a new login event input from the new user, the new login event input being associated with a second session of the new user logging into the account;

access a machine learning model, wherein the machine learning model is trained using data selected based on a similarity of behavior between different prior users other than the new user, the selected data comprises a plurality of negative pairs, and each negative pair is selected based on similarity between login features of a respective first prior user and login features of a respective second prior user; and authenticate, with the machine learning model, the new user for the account, based at least in part on the reference login event input and the new login event input.

* * * * *